Patented Jan. 31, 1950

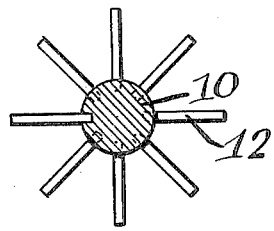
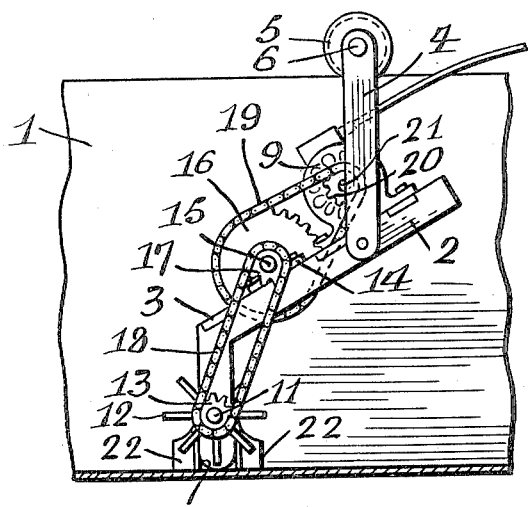
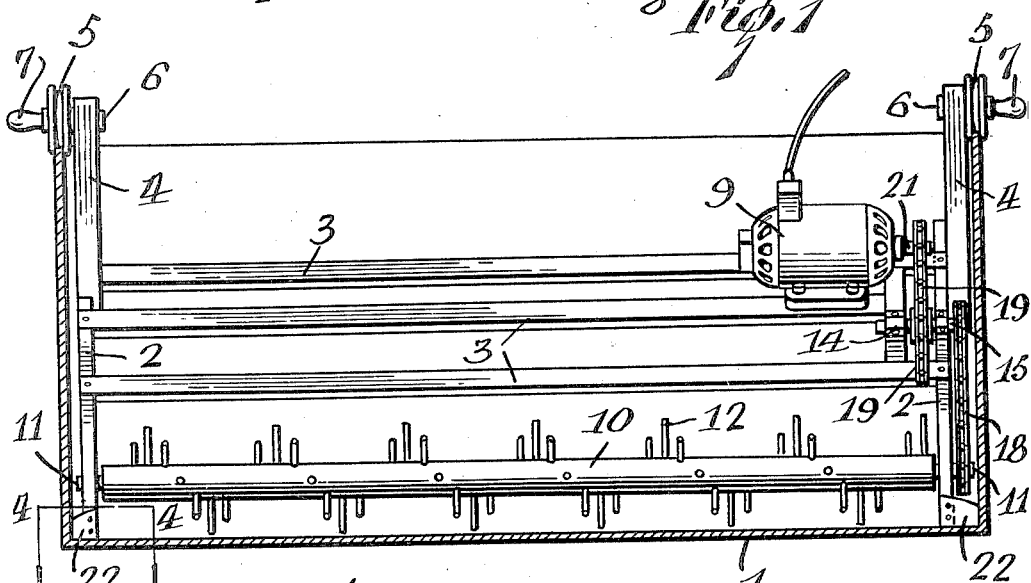

2,496,001

UNITED STATES PATENT OFFICE 2,496,001

APPARATUS FOR AGITATING CURDS

Pierre Paul Caumartin, St-Cuthbert, Quebec, Canada

Application August 21, 1944, Serial No. 550,386
In Canada May 31, 1944

3 Claims. (Cl. 31—48)

The present invention pertains to a device for circulating and stirring milk curds in making cheese.

The principal object of the invention is to provide a device of this character that renders the work easier and diminishes the manual labor involved. Another object is to stiffen the curds while agitating them, thereby producing a firmer curd and a better quality.

It is recognized that curd has the property of exuding, because of its tendency to undergo synaeresis, a lemon-colored transparent serum that is undesirable in the mass. In order to facilitate the exudation, the curd is circulated in fragments as nearly uniform as possible, but never so small as to form a mash. When the curd is circulated under these conditions, it retains a plasticity which effects a union of the larger fragments into a compact cake formed in a mold which is mounted in a press.

The circulating and stirring is done in Europe with curd choppers and wire stirring rods. In America, merely armed forks are used. The work is laborious and requires several workers for a single receptacle. The work is especially tiresome since the worker must bend over the edge in order to reach the curd coagulated in the bottom of the vessel.

Another object of the invention is to provide an agitator capable of producing uniform circulation and stirring. Still another object is to provide an apparatus that is easy to transport and install.

Another object is to provide a mechanism that can operate with the aid of an electric motor that is easily replaced by a crank where there is no electricity.

In the accomplishment of these objects, the invention comprises a frame suspended transversely on the edges of a vessel containing the curd. The frame rides on wheels and carries near the bottom of the vessel a cylindrical member provided with radial teeth disposed in a helix on its periphery. The frame also carries an electric motor geared to the cylindrical member for rotating it. The frame also establishes a uniform distance between the bottom of the vessel and the cylindrical member and further provides scrapers for the longitudinal corners in the bottom of the vessel.

The invention is fully disclosed by way of example in the following description and in the accompanying drawing in which:

Figure 1 is an end view of the device;

Figure 2 is a vertical section of the toothed cylinder;

Figure 3 is a longitudinal section, and

Figure 4 is a section on the line 4—4 of Figure 3.

Reference to these views will now be made by use of like characters which are employed to designate corresponding parts throughout.

In Figures 1 and 3 is shown a large receptacle 1 for receiving milk treated with rennet for curdling on coagulation. There is provided a frame formed of two vertical members 2 joined by horizontal members 3. The frame is suspended from the edges of the receptacle by vertical arms 4 provided at their upper ends with wheels 5 rolling on said edges. The wheels are grooved, and their axles 6 supporting them on the arms are extended externally as handles 7.

The lower ends of the members 2 rest on the bottom of the vessel 1, and in order to ride better, are rounded at 8. The upper portions of the members 2 are inclined in such manner that the members 3 may support an electric motor 9 for rotating a cylinder 10 having its ends journalled at 11 at the lower ends of the members 2. The cylinder 10 is provided with radial teeth 12 arranged in a helix. In their lowermost position the ends of the teeth nearly touch the bottom of the vessel 1 for a purpose that will presently be described.

One of the journals 11 is prolonged between a member 2 and the adjacent wall of the vessel to receive a small gear 13. About midway between the motor 9 and the cylinder 10 two bearings 14 are mounted on the members 3 to receive a shaft 15 on which are keyed two gears 16 and 17, the latter of which is smaller than the first. An endless chain 18 connects the small gears 13 and 17 while another chain 19 connects the larger gear 16 to a small gear 20 fixed on the shaft 21 of the motor 9.

The bottoms of the members 2 are provided with scrapers 22 for cleaning the longitudinal corners of the vessel 1 that cannot be reached by the teeth 12 because of the spacing of the members 2 from the sides of the vessel.

In the operation of the device, when the curd is to be circulated and agitated, the relatively light frame 2, 3 is mounted on the edges of the vessel and suspended by its rollers 5 resting on the edges. The motor 9 is started and turns the cylinder 10 through the gears and chains. The radial teeth 12 penetrate the curd and circulate as well as stir it. The frame 2, 3 is moved along the vessel by the handles 7 as required. The frame is finally lifted and can be mounted on another receptacle ready for stirring. The feet or rounded ends 8 prevent the teeth 12 from coming into contact with the bottom of the vessel so that they are not broken, inasmuch as they are preferably made of wood.

Although a specific embodiment of the invention has been illustrated and described it will be understood that various alterations in the details of construction may be made without departing from the scope of the invention as indicated by the appended claims.

What I claim as my invention is:

1. An agitator for curds comprising a vessel, a pair of rollers mounted on opposite edges of said vessel, vertical members suspended from said rollers, the lower ends of said members being rounded and engaging the bottom of said vessel, scrapers on said lower ends and positioned to extend into the corners of said vessel, an agitator rotatably supported by said vertical members and spaced slightly from said bottom, and means supported by said vertical members for driving said agitator.

2. An agitator for curds comprising a vessel, a pair of rollers mounted on opposite edges of said vessel, an arm suspended from each of said rollers, vertical frame members pivotally attached to said arms and engaging the bottom of said vessel, horizontal members joining said frame members, an agitator rotatably supported by said frame members and spaced slightly from said bottom, and means carried by said horizontal members for driving said agitator.

3. An agitator for curds comprising a vessel, a pair of rollers mounted on opposite edges of said vessel, an arm suspended from each of said rollers, vertical frame members pivotally attached to said arms, the lower ends of said frame members being rounded and riding on the bottom of said vessel, scrapers on said lower ends and positioned to extend into the corners of said vessel, horizontal members joining said frame members, an agitator rotatably supported by said frame members and spaced from said bottom, and means carried by said horizontal members for driving said agitator.

PIERRE PAUL CAUMARTIN.

REFERENCES CITED

The following references are of record in the file of this patent:

UNITED STATES PATENTS

| Number | Name | Date |
|---|---|---|
| 80,089 | Ralph | July 21, 1868 |
| 91,622 | Hall | June 22, 1869 |
| 233,698 | Rankin | Oct. 26, 1880 |
| 349,405 | Pohl | Sept. 21, 1886 |
| 725,840 | Hastings | Apr. 21, 1903 |
| 1,061,401 | Penn | May 13, 1913 |
| 1,781,373 | Derfus | Nov. 11, 1930 |
| 2,086,353 | Damrow | July 6, 1937 |

FOREIGN PATENTS

| Number | Country | Date |
|---|---|---|
| 11,954 | Netherlands | Oct. 15, 1924 |